(12) United States Patent
Kim et al.

(10) Patent No.: US 8,761,774 B2
(45) Date of Patent: Jun. 24, 2014

(54) METHOD AND SYSTEM FOR TRANSMITTING/RECEIVING NEIGHBOR BASE-STATION ADVERTISEMENT MESSAGE IN BROADBAND WIRELESS ACCESS SYSTEM

(75) Inventors: Jun-Hyung Kim, Seoul (KR); Hong-Sung Chang, Gyeonggi-do (KR); Yong Chang, Gyeonggi-do (KR); Geun-Hwi Lim, Gyeonggi-do (KR); Jung-Won Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/610,294

(22) Filed: Sep. 11, 2012

(65) Prior Publication Data

US 2013/0005343 A1    Jan. 3, 2013

Related U.S. Application Data

(63) Continuation of application No. 11/259,383, filed on Oct. 26, 2005, now Pat. No. 8,280,380.

(30) Foreign Application Priority Data

Oct. 26, 2004    (KR) .................. 10-2004-0085915

(51) Int. Cl.
*H04W 36/00* (2009.01)
(52) U.S. Cl.
USPC ........ 455/439; 455/418; 455/436; 455/67.11; 455/560
(58) Field of Classification Search
USPC .............. 455/418, 436–443, 423, 424, 67.11, 455/434, 560; 370/328
See application file for complete search history.

(56) References Cited

U.S. PATENT DOCUMENTS

| | | | |
|---|---|---|---|
| 6,819,923 | B1 | 11/2004 | Friman |
| 2003/0147371 | A1 | 8/2003 | Choi et al. |
| 2003/0236897 | A1 | 12/2003 | Shitano et al. |
| 2004/0176094 | A1 | 9/2004 | Kim et al. |
| 2004/0185853 | A1 | 9/2004 | Kim et al. |
| 2005/0053043 | A1* | 3/2005 | Rudolf et al. ............ 370/337 |

(Continued)

FOREIGN PATENT DOCUMENTS

| | | |
|---|---|---|
| EP | 1 473 956 | 11/2004 |
| JP | 06-232807 | 8/1994 |

(Continued)

OTHER PUBLICATIONS

Draft IEEE Standard for Local and Metropolitan Area Networks, Part 16: Air Interface for Fixed and Mobile Broadband Wireless Access Systems, Sep. 18, 2004.

(Continued)

*Primary Examiner* — Marcos Torres
(74) *Attorney, Agent, or Firm* — The Farrell Law Firm, P.C.

(57) ABSTRACT

A method and system for transmitting/receiving a neighbor base-station information message in a broadband wireless access system. A method includes receiving, by the mobile station, a neighbor BS information message; determining whether or not an operator ID field related to a first neighbor BS is included in the neighbor BS information message; and determining that the first neighbor BS has identical BS information as a serving BS, if the operator ID field is not included in the neighbor BS information message.

12 Claims, 2 Drawing Sheets

(56) References Cited

U.S. PATENT DOCUMENTS

| | | |
|---|---|---|
| 2005/0124372 A1* | 6/2005 | Lundby et al. ............... 455/522 |
| 2005/0266845 A1 | 12/2005 | Aerrabotu et al. |
| 2008/0051087 A1 | 2/2008 | Ryu et al. |

FOREIGN PATENT DOCUMENTS

| | | |
|---|---|---|
| JP | 2007-536874 | 12/2007 |
| KR | 1020040032678 | 4/2004 |
| RU | 2 159 007 | 8/1990 |
| WO | WO 2004/040793 | 5/2004 |
| WO | WO 2004/098221 | 11/2004 |
| WO | WO 2005/107379 | 11/2005 |

OTHER PUBLICATIONS

Kanggyu Lee et al., Effective Neighbor BS Advertising Signaling, Nov. 3, 2004.

* cited by examiner

METHOD AND SYSTEM FOR TRANSMITTING/RECEIVING NEIGHBOR BASE-STATION ADVERTISEMENT MESSAGE IN BROADBAND WIRELESS ACCESS SYSTEM

PRIORITY

This application is a Continuation of U.S. application Ser. No. 11/259,383, which was filed in the U.S. Patent and Trademark Office on Oct. 26, 2005, and claims priority under 35 U.S.C. 119(a) to Korean Application Serial No. 10-2004-0085915, which was filed in the Korean Intellectual Property Office on Oct. 26, 2004, the content of each of which is incorporated herein by reference.

BACKGROUND OF THE INVENTION

1. Field of the Invention

The present invention relates to a method and system for transmitting/receiving messages in a wireless communication system, and more particularly to a method and system for transmitting/receiving neighbor base-station advertisement messages broadcast by a base station in a broadband wireless access (BWA) system.

2. Description of the Related Art

Fourth generation (4G) communication systems, which are the next generation communication systems, are being designed to provide users with services having various Qualities of Service (QoS) and supporting a transmission speed of about 100 Mbps. Particularly, in current 4G communication systems, research is being undertaken to support a high-speed service by ensuring mobility and QoS in broadband wireless access communication systems, such as a local area network (LAN) system and a metropolitan area network (MAN) system. A representative communication system currently being developed is known as an IEEE (Institute of Electrical and Electronics Engineers) 802.16 communication system.

Compared with conventional wireless technologies for providing voice services, the IEEE 802.16 communication system enables the transmission of data in a shorter period of time than needed if using conventional communication technologies, by providing a wider data bandwidth, and can efficiently use channels by sharing all user channels. In addition, the IEEE 802.16 communication system ensures QoS, so that users can receive services of different QoS depending on the characteristics of the services.

From among the IEEE 802.16 communication system, an IEEE 802.16a communication system does not take into consideration the mobility of a terminal, while an IEEE 802.16e communication system takes into consideration the mobility of a terminal (e.g., a mobile station).

Therefore, in the IEEE 802.16e communication system, a base station periodically broadcasts a MOB_NBR-ADV (mobile neighbor advertisement) message, which is information about neighbor base stations, to all mobile stations located in a corresponding cell in order to support the handover of the mobile stations, thereby notifying the mobile stations of neighbor base-station state information. That is, when a mobile station located in a cell moves into a neighbor cell, the mobile station can perform a handover because the mobile station already understands a neighbor cell's base-station information such as a network identifier and channel characteristics broadcast from the base station.

Table 1 below shows the format of a conventional MOB_NBR-ADV message used to report neighbor base station information from a base station to a mobile station. These message formats are generally known in the art, so a detailed description thereof will be omitted for the sake of clarity.

TABLE 1

| Syntax | Size | Notes |
|---|---|---|
| MOB_NBR-ADV_Message_Format( ) { | | |
| Management Message Type = 53 | 8 bits | |
| Operator ID | 24 bits | Unique ID assigned to the operator |
| Configuration Charge Count | 8 bits | Incremented each time the information for the associated neighbor BS has changed. |
| Fragmentation Index | 4 bits | This field indicates the current fragmentation index. |
| Total Fragmentation | 4 bits | This field indicates the total number of fragmentations |
| Skip-Optional-Fields Flag | 1 bit | If set to '1' and if a neighbor has OFDMA PHY the BS-ID for that neighbor is omitted in this message. If set to '0', BS-ID is not omitted for any neighbor. |
| N_NEIGHBORS | 8 bits | |
| For (j=0; j<N_NEIGHBORS; j++){ | | |
| Length | 8 bits | Length of message information within the iteration of N_NEIGHBOR in bytes. |
| PHY Profile ID | 8 bits | Aggregated IDs of Co-located FA Indicator, FA Configuration Indicator, FFT size, Bandwidth, Operation Mode of the starting subchannelization of a frame, and Channel Number |
| if (FA Index Indicator = = 1) { | | |
| FA Index | 8 bits | This field, Frequency Assignment Index, is present only the FA Index Indicator in PHY Profile ID is set. Otherwise, the neighbor BS has the same FA Index or the center |

TABLE 1-continued

| Syntax | Size | Notes |
|---|---|---|
| } | | frequency is indicated using the TLV encoded information. |
| if (BS EIRP Indicator == 1) { | | |
| BS EIRP | 8 bits | Signed Integer from −128 to 127 in units of dBm This field is present only if the BS EIRP indicator is set in PHY Profile ID. Otherwise, the BS has the same EIRP as the serving BS. |
| } | | |
| Neighbor BS-ID | 24 bits | This is an optional field for OFDMA PHY and it is omitted or skipped if Skip Optional Fields Flag = '1' |
| Preamble Index | 8 bits | The index for the PHY profile specific preamble. Preamble Index is PHY specific for SCa and OFDMA. The value of Preamble Index shall be ignored and a value of '0x00' shall be used for OFDM PHY |
| HO Process Optimization | 8 bits | HO Process Optimization is provided as part of this message is indicative only. HO process requirements may change at time of actual HO. For each Bit location, a value of '0' indicates the associated reentry management messages shall be required, a value of '1' indicates the reentry management message may be omitted. Regardless of the HO Process Optimization TLV settings, the Target BS may send unsolicited SBC-RSP and/or REG-RSP management messages Bit #0: Omit SBC-REQ/RSP management messages during current re-entry processing Bit #1: Omit PKM-REQ/RSP management message during current re-entry processing Bit #2: Omit REG-REQ/RSP management during current re-entry processing Bit #3: Omit Network Address Acquisition management messages during current reentry processing Bit #4: Omit Time of Day Acquisition management messages during current reentry processing Bit #5: Omit TFTP management messages during current re-entry processing Bit #6: Full service and operational state transfer or sharing between Serving BS and Target BS (ARQ, timers, counters, MAC state machines, etc . . .) |
| Scheduling Service Supported | 4 bits | Bitmap to indicate if BS supports a particular scheduling service. '1' indicates support, '0' indicates not support: bit 0: Unsolicited Grant Service (UGS) bit 1: Real-time Polling Service (rtPS) bit 2: Non-real-time Polling service (nrtPS) bit 3: Best Effort value of '1111' indicates no information on service available |
| Available Radio Resource | 4 bits | Percentage of reported average available subchannels and symbols resources per frame 0000: 0% 0001: 20% 0010: 40% 0011: 60% 0100: 80% 0101: 100% 0110-1110: reserved 0110-1110: reserved value of '1111' indicates no information on service available |
| Hand Off Neighbor Preference | 2 bits | 00 Normal 01 Preferred 10 Non-Preferred 11 Reserved |
| DCD Configuration Change Count | 4 bits | This represents the Neighbor BS current DCD configuration change count |

TABLE 1-continued

| Syntax | Size | Notes |
|---|---|---|
| UCD Configuration Change Count | 4 bits | This represents the Neighbor BS current UCD configuration change count |
| TLV Encoded Neighbor information<br>}<br>} | Variable | TLV specific |

The following Table 2 illustrates information included in a TLV Encoded Neighbor information field of the MOB_NBR-ADV message, which includes a downlink channel descriptor setting (DCD_settings) field and an uplink channel descriptor setting (UCD_settings) field.

TABLE 2

| Name | Type (1 byte) | Length (1 byte) | Value (Variable-length) |
|---|---|---|---|
| DCD_settings | | Variable | The DCD_settings is a compound TLV value that encapsulates a DCD message that may be transmitted in the advertised BS downlink channel. This information is intended to enable fast synchronization of the SS with the advertised BS downlink. The DCD settings fields shall contain only neighbor's DCD TLV values which are different from the Serving BS corresponding values. For values that are not included, the MSS shall assume they are identical to the serving BSs corresponding values. |
| UCD_settings | | Variable | The UCD_settings is a compound TLV value that encapsulates a UCD message that may be transmitted in the advertised BS downlink channel. This information is intended to enable fast synchronization of the SS with the advertised BS uplink. The UCD settings fields shall contain only neighbor's UCD TLV values which are different from the Serving BS's corresponding values. For values that are not included, the MSS shall assume they are identical to the serving BS's corresponding values. |

The DCD_settings field in Table 2 is configured using the TLV value of a DCD message, which may be expressed in the format of Table 3. Such a DCD_settings field is generally known in the art, so a detailed description thereof will be omitted for the sake of clarity.

TABLE 3

| Name | Type (1 byte) | Length | Value (variable length) | PHY scope |
|---|---|---|---|---|
| Downlink_Burst_Profile | 1 | | May appear more than once (see 6.3.2.3.1). The length is the number of bytes in the overall object, including embedded TLV items | All |
| BS EIRP | 2 | 2 | Signed in units of 1 dBM. | All |
| Frame duration | 3 | 4 | The number of PSs contained in a Burst FDD or TDD frame. Required only for framed downlinks | SC |
| PHY Type | 4 | 1 | The PHY Type to be used. | SC |
| Power adjustment rule | 5 | 1 | 0 = Preserve Peak Power<br>1 = Preserve Mean Power<br>Describes the power adjustment rule when | SC, SCa |

TABLE 3-continued

| Name | Type (1 byte) | Length | Value (variable length) | PHY scope |
|---|---|---|---|---|
| | | | performing a transition from one burst profile to another. | |
| Channel Nr | 6 | 1 | Downlink channel number as defined in 8.5. Used for license-exempt operation only. | SCa, OFDM, OFDMA |
| TTG | 7 | 1 | TTG (in PSs) | SCa, OFDM, OFDMA |
| RTG | 8 | 1 | RTG (in PSs) | SCa, OFDM, OFDMA |
| RSSIR, max | 9 | 2 | Initial Ranging Max. Received Signal Strength at BS Signed in units of 1 dBm | All |
| Channel Switch Frame Number | 10 | 3 | Channel switch frame number as defined in 6.3.15.7, Used for license-exempt operation only | SCa, OFDM, OFDMA |
| Frequency | 12 | 4 | Downlink center frequency (kHz). | All |
| BS ID | 13 | 6 | Base Station ID | SCa, OFDM, OFDMA |
| Frame Duration Code | 14 | 1 | The duration of the frame. The frame duration code values are specified in Table 230. | OFDM |
| Frame Number | 15 | 3 | The number of the frame containing the DCD message. | OFDM |

The conventional base station periodically broadcasts a MOB_NBR-ADV message including a TLV encoded neighbor information field as shown in Table 1 in order to notify a mobile station of neighbor base station information. Meanwhile, information related to a base station identifier (BS_ID) field included in the DCD_settings is an iteration of information related to neighbor base-station identifier (neighbor BS_ID) of the MOB_NBR-ADV message. That is, the BS_ID information of the DCD_settings can be recognized by using a neighbor BS_ID and an operator identifier of the MOB_NBR-ADV message. Therefore, the conventional system repeatedly transmits the TLV information of the MOB_NBR-ADV message corresponding to the number of neighbor base stations, and incurs a signaling load due to iterative transmission of the BS_ID of the DCD_settings field.

In addition, an operator identifier (ID) included in the MOB_NBR-ADV message in order to report information about a network operator as shown in Table 1 does not change while a mobile station is using the same network operator. Therefore, when operator ID information is included in every transmitted MOB_NBR-ADV message, overhead may increase, degrading transmission efficiency.

SUMMARY OF THE INVENTION

Accordingly, the present invention has been made to solve the above-mentioned problems occurring in the prior art, and an object of the present invention is to provide a method and system for transmitting/receiving a neighbor base-station advertisement message to be transmitted to a mobile station in a broadband wireless access system.

Another object of the present invention is to provide a method and system for transmitting/receiving a neighbor base-station message in a broadband wireless access system, capable of omitting an operator ID, which must be transmitted whenever a neighbor base-station advertisement message is transmitted, according to necessity and reducing an overhead caused by iterative transmission of base station identifier information.

To accomplish these objects, in accordance with one aspect of the present invention, there is provided a method for receiving neighbor Base Station (BS) information by a mobile station in a wireless communication system. The method includes receiving, by the mobile station, a neighbor BS information message; determining whether or not an operator IDentifier (ID) field related to a first neighbor BS is included in the neighbor BS information message; and determining that the first neighbor BS has identical BS information as a serving BS, if the operator ID field is not included in the neighbor BS information message.

In accordance with another aspect of the present invention, there is provided a method for transmitting neighbor Base Station (BS) information by a serving BS in a wireless communication system. The method includes determining whether or not a first neighbor BS has identical BS information as the serving BS; determining that an operator IDentifier (ID) field related to the first neighbor BS is not included in a neighbor base station (BS) information message, if the first neighbor BS has the identical BS information as the serving BS; and transmitting the neighbor BS information message to mobile stations located in a cell of the serving BS.

In accordance with another aspect of the present invention, there is provided an apparatus in a mobile station for receiving neighbor Base Station (BS) information in a wireless communication system. The apparatus includes a receiver for receiving a neighbor BS information message from a serving BS; and a processor for determining whether or not an operator IDentifier (ID) field related to a first neighbor BS is included in the neighbor BS information message, and determining that the first neighbor BS has identical BS information as the serving BS, if the operator ID field is not included in the neighbor BS information message.

In accordance with another aspect of the present invention, there is provided an apparatus in a serving Base Station (BS) for transmitting neighbor BS information in a wireless communication system. The apparatus includes a processor for determining whether or not a first neighbor BS has identical BS information as the serving BS, and determining that an operator ID field related to the first neighbor BS is not included in a neighbor BS information message, if the first neighbor BS has the identical BS information as the serving BS; and a transmitter for transmitting the neighbor BS information message to mobile stations located in a cell of the serving BS.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Hereinafter, a preferred embodiment of the present invention will be described with reference to the accompanying drawings. In the following description of the embodiments of the present invention, a detailed description of known functions and configurations incorporated herein will be omitted when it may obscure the subject matter of the present invention. It should be noted that the MOB ADV message will hereinafter refer to the MOB ADV message according to an embodiment of the present invention unless indicated otherwise.

The present invention proposes a method and system for minimizing the size of a neighbor base-station advertisement (MOB_NBR-ADV) message to be transmitted in a broadband wireless access system according to the present invention. In detail, the present invention proposes a method for omitting an operator identifier(ID) field of the MOB_NBR-ADV message, and a method for omitting a base station identifier (BS ID) of a downlink channel descriptor (DCD) setting field from among a type/length/value (TLV) encoded neighbor information field of the MOB_NBR-ADV message. The following description according to the present invention can be applied to the IEEE 802.16e system.

Figure 1:
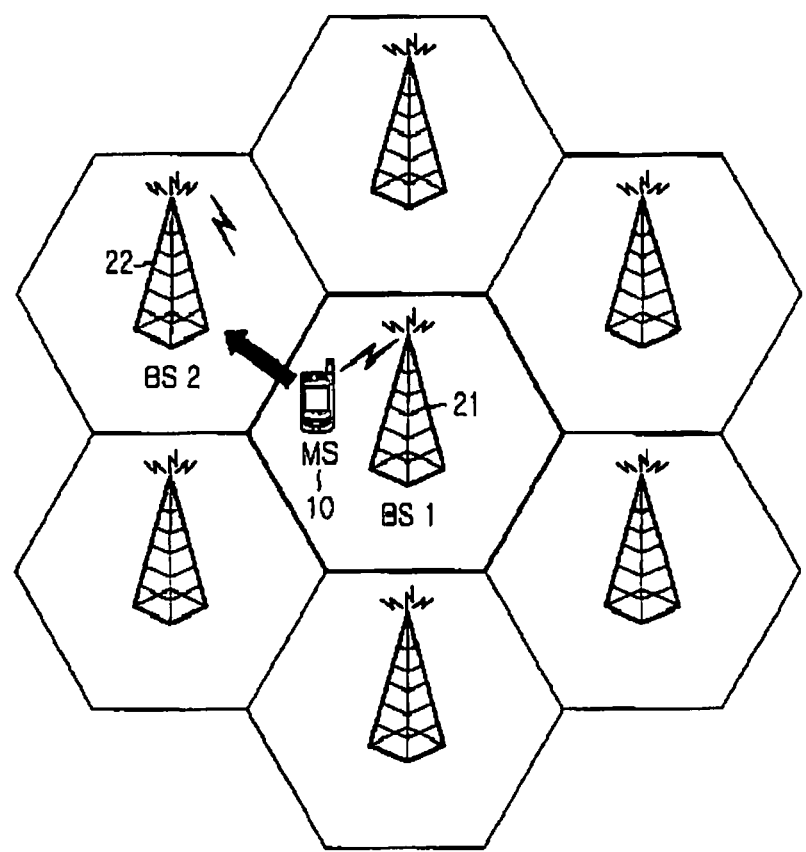
FIG. 1 is a diagram illustrating the configuration of cells configured by base stations for supporting an IEEE 802.16e system according to an embodiment of the present invention.

FIG. 1 is a diagram schematically illustrating the configuration of an IEEE 802.16e communication system according to an embodiment of the present invention.

A mobile station 10 having received the service of a first base station (BS 1) 21 moves to the cell of a second base station (BS 2) 22 (as depicted by the arrow), which is a neighbor base station. In this case, the mobile station 10 must have information about the neighbor base station in advance in order to receive the service of the second base station 22 and not experience a service discontinuity.

The mobile station 10 can check neighbor base station's network operator information, base station information, scheduling information, available resource information, whether or not a message is fragmented, etc., by receiving and using the MOB_NBR-ADV message. The format of the MOB_NBR-ADV message according to the embodiment of the present invention is shown in Table 4 below.

TABLE 4

| Syntax | Size | Notes |
|---|---|---|
| MOB_NBR-ADV_Message_Format( ) { | | |
| Management Message Type = 53 | 8 bits | |
| Operator ID Flag | 1 bit | If set to '1', Operator ID will be omitted |
| Reserved | 2 bits | |
| Configuration Change Count | 8 bits | Incremented each time the information for the associated neighbor BS has changed. |
| Fragmentation Index | 4 bits | This field indicates the current fragmentation index. |
| Total Fragmentation | 4 bits | This field indicates the total number of fragmentations |
| Skip-Optional-Fields Flag | 1 bit | If set to '1' and if a neighbor has OFDMA PHY the BS-ID for that neighbor is omitted in this message. If set to '0', BS-ID is not omitted for any neighbor. |
| If ( Operator ID Flag == 0) | | |
| Operator ID | 24 bits | Unique ID assigned to the operator |
| } | | |
| N_NEIGHBORS | 8 bits | |
| For (j=0; j<N_NEIGHBORS; j++){ | | |
| Length | 8 bits | Length of message information within the iteration of N_NEIGHBOR in bytes. |
| PHY Profile ID | 8 bits | Aggregated IDs of Co-located FA Indicator, FA Configuration Indicator, FFT size, Bandwidth, Operation Mode of the starting subchannelization of a frame, and Channel Number |

TABLE 4-continued

| Syntax | Size | Notes |
|---|---|---|
| if (FA Index Indicator == 1) {<br>FA Index | 8 bits | This field, Frequency Assignment Index, is present only the FA Index Indicator in PHY Profile ID is set. Otherwise, the neighbor BS has the same FA Index or the center frequency is indicated using the TLV encoded information. |
| }<br>if (BS EIRP Indicator == 1) {<br>BS EIRP | 8 bits | Signed Integer from −128 to 127 in units of dBm This field is present only if the BS EIRP indicator is set in PHY Profile ID. Otherwise, the BS has the same EIRP as the serving BS. |
| }<br>Neighbor BS_ID | 24 bits | This is an optional field for OFDMA PHY and it is omitted or skipped if Skip Optional Fields Flag = '1' |
| Preamble Index | 8 bits | The index for the PHY profile specific preamble. Preamble Index is PHY specific for SCa and OFDMA. The value of Preamble Index shall be ignored and a value of '0x00' shall be used for OFDM PHY |
| HO Process Optimization | 8 bits | HO Process Optimization is provided as part of this message is indicative only. HO process requirements may change at time of actual HO. For each Bit location, a value of '0' indicates the associated reentry management messages shall be required, a value of '1' indicates the reentry management message may be omitted. Regardless of the HO Process Optimization TLV settings, the Target BS may send unsolicited SBC-RSP and/or REG-RSP management messages Bit #0: Omit SBC-REQ/RSP management messages during current re-entry processing Bit #1: Omit PKM-REQ/RSP management message during current re-entry processing Bit #2: Omit REG-REQ/RSP management during current re-entry processing Bit #3: Omit Network Address Acquisition management messages during current reentry processing Bit #4: Omit Time of Day Acquisition management messages during current reentry processing Bit #5: Omit TFTP management messages during current re-entry processing Bit #6: Full service and operational state transfer or sharing between Serving BS and Target BS (ARQ, timers, counters, MAC state machines, etc . . . ) |
| Scheduling Service Supported | 4 bits | Bitmap to indicate if BS supports a particular scheduling service. '1' indicates support, '0' indicates not support: bit 0: Unsolicited Grant Service (UGS) bit 1: Real-time Polling Service (rtPS) bit 2: Non-real-time Polling service (nrtPS) bit 3: Best Effort value of '1111' indicates no information on service available |
| Available Radio Resource | 4 bits | Percentage of reported average available subchannels and symbols resources per frame 0000: 0% 0001: 20% 0010: 40% 0011: 60% 0100: 80% 0101: 100% 0110-1110: reserved 0110-1110: reserved value of '1111' indicates no information on |

TABLE 4-continued

| Syntax | Size | Notes |
| --- | --- | --- |
| Hand Off Neighbor Preference | 2 bits | service available 00: Normal; 01: Preferred 10: Non-Preferred; 11: Reserved |
| DCD Configuration Change Count | 4 bits | This represents the Neighbor BS current DCD configuration change count |
| UCD Configuration Change Count | 4 bits | This represents the Neighbor BS current UCD configuration change count |
| TLV Encoded Neighbor information | Variable | TLV specific |
| } } | | |

The MOB_NBR-ADV message shown in Table 4 further includes a 2-bit reserved field in order to set the length of the conventional MOB_NBR-ADV message shown in Table 1 using byte units. In the MOB_NBR-ADV message according to the present invention, an operator ID flag field is newly defined. The operator ID flag field is used to report whether a MOB_NBR-ADV message includes an operator ID field. For example, when the operator ID flag field is set to "1", it indicates that the MOB_NBR-ADV message dose not include an operator ID field. In contrast, when the operator ID flag field is set to "0", the mobile station refers to an operator ID field.

Since the operator ID field contains information about a network operator, it is unnecessary to periodically update the operator ID field while a mobile station is using the same operator's network. Therefore, while a mobile station is continuously located in the same operator's network, the operator ID flag field is set to "1" and the operator ID field can be deleted. As a result, the total size of the MOB_NBR-ADV message can be reduced by 3 bytes.

Hereinafter, the other fields of the MOB_NBR-ADV message shown in Table 4 will be described.

The MOB_NBR-ADV message includes an 8-bit "Management Message Type=53" field; a "Configuration Change Count" field for representing whether a corresponding message changes, by increasing by "1" whenever configuration changes; a 4-bit "Fragmentation Index" field for representing an order of a currently transmitted message when the MOB_NBR-ADV message is fragmented and therefore transmitted using a plurality of message fragments a 4-bit "Total Fragmentation" field for representing the total number of fragmented messages; and a 1-bit "Skip-Operational-Flag" field. In addition, the MOB_NBR-ADV message includes a 24-bit "Operator ID" field when the Operator ID Flag field is set to "0".

The other fields except for the above-mentioned fields in the Table 4 are related to the length, BS ID and handoff of neighbor base stations, which are generally known in the art, so a detailed description thereof will be omitted for the sake of clarity.

The operation for performing a handover of a mobile station by using the above-mentioned MOB_NBR-ADV message will be described in detail with reference to the accompanying drawings.

Figure 2:
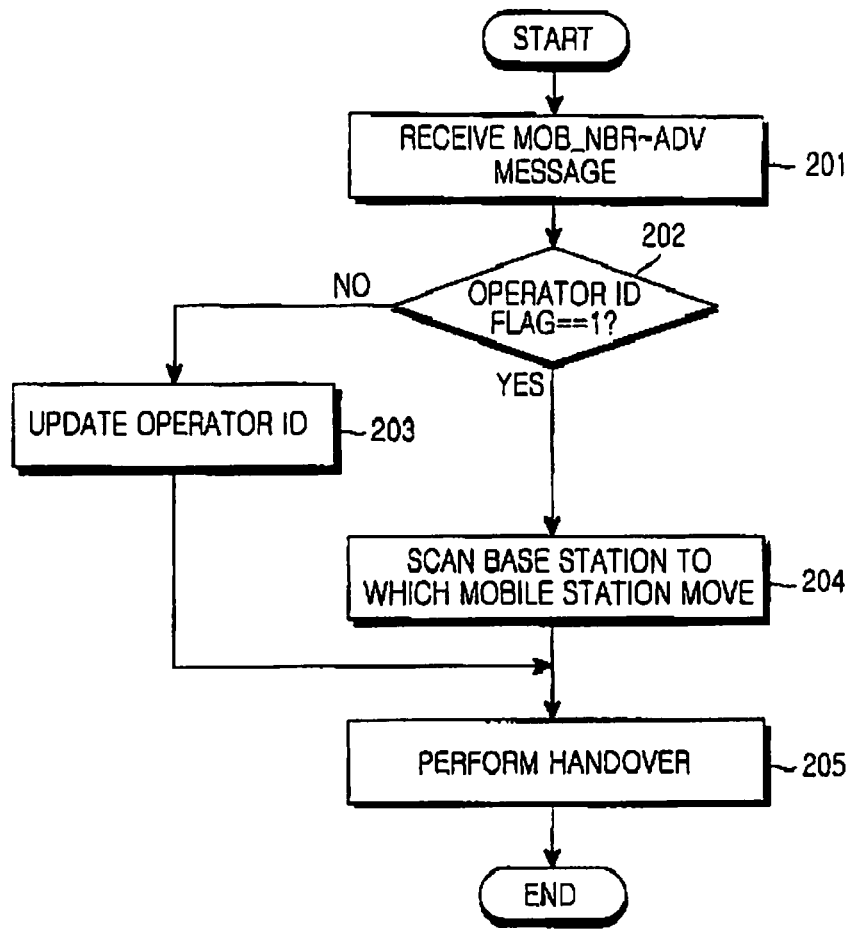
FIG. 2 is a flowchart illustrating a handover procedure of a mobile station in a mobile communication system according to an embodiment of the present invention.

FIG. 2 is a flowchart illustrating a handover procedure of a mobile station in a mobile communication system according to an embodiment of the present invention.

In order to perform a handover, a mobile station 10 must receive information about a neighbor base station in advance of the handover procedure by receiving a MOB_NBR-ADV message from a first base station 21, from which the mobile station 10 is currently receiving service. Therefore, the first base station 21 communicating with the mobile station 10 transmits a MOB_NBR-ADV message according to an embodiment of the present invention as shown in Table 4 in order to reduce iterative transmission of the TLV information of a neighbor base-station message.

Then, as shown in FIG. 2, the mobile station 10 receives the MOB_NBR-ADV message from the first base station 21 in step 201.

In step 202, the mobile station 10 checks an Operator ID Flag field from among the MOB_NBR-ADV message received from the first base station 21. As a result of the determination, if Operator ID Flag field is set to "0", the mobile station 10 updates the value of the operator ID in step 203, and then proceeds to step 204.

Alternatively, in step 202, if it is determined that the Operator ID Flag field is set to "1", the mobile station 10 directly proceeds to step 204. In step 204, the mobile station 10 scans a base station 22, to which the mobile station 10 moves, and then performs a handover procedure in step 205.

Meanwhile, the MOB_NBR-ADV message set to reduce iterative transmission of the TLV information of a neighbor base-station message will be described with reference to Table 4.

The MOB_NBR-ADV message includes a 3-byte "Operator ID" field and a 3-byte "Neighbor BS_ID" field. Meanwhile, a 6-byte BS ID field included in the DCD_setting is created by combination of the 3-byte Operator ID and 3-byte Neighbor BS_ID. Therefore, when the MOB_NBR-ADV message includes the Operator ID and Neighbor BS_ID, the 6-byte BS ID field of the DCD_setting message can be omitted.

In the prior art, since the TLV information of the MOB_NBR-ADV message must be repeatedly transmitted by all neighbor base stations, overhead increases proportionately to the number of iterative transmissions of the 6-byte BS ID of the DCD_setting field. In this case, the BS ID field of the DCD_setting TLV has a size of 6 bytes and includes a type of 1 byte and a length of 1 byte, so that the total size for representing the BS ID becomes 8 bytes. However, according to an embodiment of the present invention, the BS ID field from among the format of the DCD_setting is omitted, thereby reducing overhead "R" as expressed in Equation 1 below.

$$R = N \times 8 \text{ bytes} \qquad \text{Equation 1}$$

That is, when a base station broadcasts neighbor base-station information message for 10 neighbor base stations to a mobile station, an overhead of (N×8 bytes=10×8 bytes) 80 bytes can be reduced by omitting the BS ID field included in the DCD_setting message.

As described above, according to the present invention, when a base station transmits neighbor base station information messages to a mobile station in a broadband wireless access system, information either not required to be repeatedly transmitted for every message or iteratively transmitted is omitted, and an indication field (Operator ID Flag) for updating such information is added, so that it is possible to reduce overhead and improve a transmission efficiency.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for receiving neighbor Base Station (BS) information by a mobile station in a wireless communication system, the method comprising:
   receiving, by the mobile station, a neighbor BS information message;
   identifying if an operator IDentifier (ID) field identifying a network operator of a neighbor BS is not included in the neighbor BS information message; and
   assigning operator information of the serving BS to the neighbor BS, when it is identified that the operator ID field is not included in the neighbor BS information message.

2. The method as claimed in claim 1, wherein the identical operator information includes the operator ID field related to the neighbor BS.

3. The method as claimed in claim 1, further comprising:
   checking the operator ID field related to the neighbor BS from the neighbor BS information message, when it is identified that the operator ID field is included in the neighbor BS information message.

4. A method for transmitting neighbor Base Station (BS) information by a serving BS in a wireless communication system, the method comprising:
   determining whether or not a neighbor BS has identical operator information as the serving BS;
   generating a neighbor BS information message that does not include an operator IDentifier (ID) field identifying a network operator of the neighbor BS, when it is determined that the neighbor BS has the identical operator information as the serving BS; and
   transmitting the neighbor BS information message to mobile stations located in a cell of the serving BS.

5. The method as claimed in claim 4, wherein the identical operator information includes the operator ID field related to the neighbor BS.

6. The method as claimed in claim 4, further comprising:
   adding the operator ID field related to the first neighbor BS into the neighbor BS information message, when it is determined that the neighbor BS has neighbor operator information that is different from the serving BS.

7. An apparatus in a mobile station for receiving neighbor Base Station (BS) information in a wireless communication system, the apparatus comprising:
   a receiver for receiving a neighbor BS information message from a serving BS; and
   a processor for identifying if an operator IDentifier (ID) field identifying a network operator of related to a neighbor BS is not included in the neighbor BS information message, and assigning operator information of the serving BS to the neighbor BS, when it is identified that the operator ID field is not included in the neighbor BS information message.

8. The apparatus as claimed in claim 7, wherein the identical operator information comprises the operator ID field related to the neighbor BS.

9. The apparatus as claimed in claim 7, wherein the processor checks the operator ID field related to the neighbor BS from the neighbor BS information message, when it is identified that the operator ID field is included in the neighbor BS information message.

10. An apparatus in a serving Base Station (BS) for transmitting neighbor BS information in a wireless communication system, the apparatus comprising:
    a processor for determining whether or not a neighbor BS has identical operator information as the serving BS, and generating a neighbor BS information message that does not include an operator ID field identifying a network operator of the neighbor BS, when it is determined that the neighbor BS has the identical operator information as the serving BS; and
    a transmitter for transmitting the neighbor BS information message to mobile stations located in a cell of the serving BS.

11. The apparatus as claimed in claim 10, wherein the identical operator information comprises the operator ID field related to the neighbor BS.

12. The apparatus as claimed in claim 10, wherein the processor adds the operator ID field related to the neighbor BS into the neighbor BS information message, when it is determined that the neighbor BS has operator information that is different from the serving BS.

* * * * *